United States Patent [19]
Solomon et al.

[11] Patent Number: 5,205,932
[45] Date of Patent: Apr. 27, 1993

[54] POINT-OF-USE WATER PURIFICATION APPLIANCE

[75] Inventors: Fred Solomon, Wetumpka, Ala.; Bruce Benefield, Nashville, Tenn.

[73] Assignee: Nu-Water Systems, Inc., Tallassee, Ala.

[21] Appl. No.: 748,704

[22] Filed: Aug. 22, 1991

[51] Int. Cl.$^5$ .............................................. B01D 27/02
[52] U.S. Cl. .................................... 210/264; 210/266; 210/283; 210/284; 210/288
[58] Field of Search ............... 210/263, 264, 266, 283, 210/284, 288

[56] References Cited

U.S. PATENT DOCUMENTS

| | | | |
|---|---|---|---|
| 2,300,014 | 10/1942 | Saussure | 210/283 |
| 2,328,381 | 8/1943 | Jaffe | 210/283 |
| 3,554,377 | 1/1971 | Miller | 210/288 |
| 3,791,520 | 2/1974 | Nieuwenhuls | 210/283 |
| 4,529,511 | 7/1985 | Breeden et al. | 210/266 |
| 5,089,108 | 2/1992 | Small | 210/263 |

Primary Examiner—Robert A. Dawson
Assistant Examiner—W. L. Millard
Attorney, Agent, or Firm—Richard C. Litman

[57] ABSTRACT

A compression sealed bacteriostatic purification and filtration system canister for the treatment of water and other piped liquids which includes a plurality of sequential granular filtering media beds separately contained within respective sections of the canister. The canister walls have molded internal grooves to prevent channeling and to hold section separators; the structural filter separators are highly porous semi-rigid discs, and snap into the grooves. The cylindrical sections increase in diameter in the direction of liquid flow. The sections are axially stacked within the canister. Liquid is admitted at the top end of the pressure vessel tank canister, runs down through the series of sections, and then returns to the canister top to exit through an axial riser tube. The tank canister has a screw-on compression sealed cap which contains fluid inlet and outlet pressurized disconnect couplings to allow leak-free back flushing. Each compartmentalized section is cylindrical or partially conical; the conical sections interconnect with the cylindrical sections. In the cylindrical sections, the flow rate is adjusted to the particular medium therein by the in-line fluid pressure and the diameter of that section. The medium contact time is adjusted, in part, by the length of the section.

11 Claims, 1 Drawing Sheet

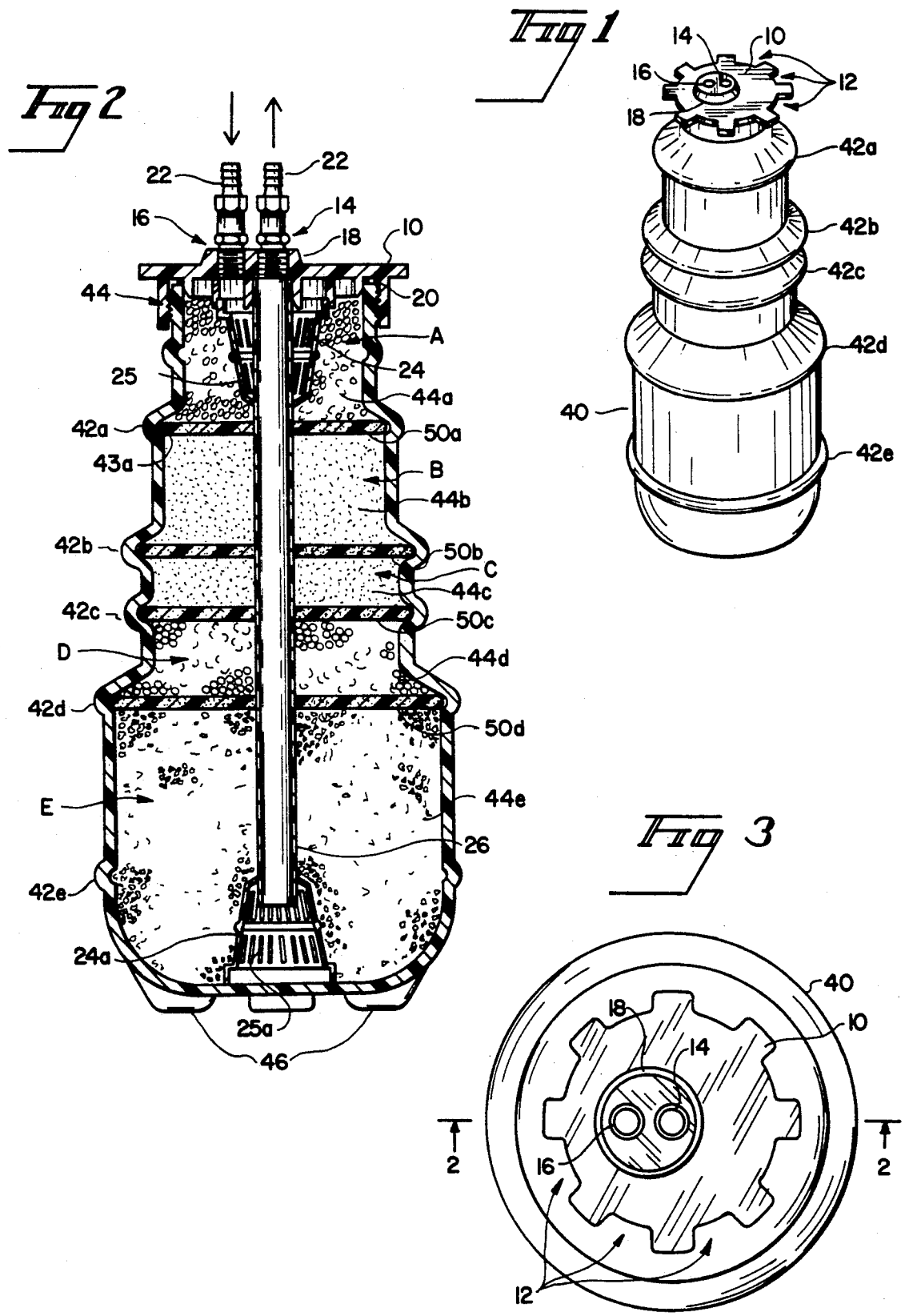

POINT-OF-USE WATER PURIFICATION APPLIANCE

FIELD OF THE INVENTION

The present invention relates to liquid purifiers containing various filter media, which media filters purify by contact of a liquid passing through the purifier.

DESCRIPTION OF THE PRIOR ART

Liquid purification is increasingly needed as more contamination is created and discovered. There is currently a need for a self-contained, reliable, and inexpensive liquid purifier.

The need is especially acute for pure water to be used for drinking, cooking and bathing. Any of these activities can lead to negative health effects if certain bacteria, inorganic compounds or organic compounds are present in the water which can be absorbed by the skin, stomach or intestines.

Especially in the case of drinking water, universal purification cannot easily be done with a single-stage process. The best available one-step processes, distillation and reverse osmosis, are wasteful and require complex equipment, cumbersome maintenance, and excessive amounts of energy. Distillation does not remove certain compounds from drinking water which have boiling points near that of water. Solar distillation uses free energy, but requires large surface areas and steady sunshine. Reverse osmosis systems typically waste up to 8 gallons of water to process 2 gallons of drinking water.

A simpler method is to have water flow over a bacteriostatic granular medium which reacts with waterborne contaminants to neutralize, absorb, or adsorb them from the flow of water.

Commercially available under-the-sink water purifiers connect in series with the supply pipe to the sink. The water typically passes through a canister containing a replaceable and disposable cartridge, which in turn contains a water purifying medium such as activated carbon.

A single filtration medium is limited in the number and volume of contaminants that can be removed or significantly reduced, as no one medium can absorb or adsorb everything except water (or any other liquid).

U.S. Pat. No. 4,851,122 of stanley shows five purifying media in a canister. The various granular media are simply placed unrestricted into the canister without barriers between them, and gradually mix and resettle in use.

Several filtration medium barriers are shown in the prior art.

French patent 811,723 shows a cylindrical canister with media separators in the shape of discs, and a central axial pipe disposed through the discs.

U.S. Pat. No. 2,300,014 of Saussure shows a cylindrical canister with hoop grooves like those of an oil drum. Separators are inserted into the grooves to hold them in place. The separators contain holes to restrict the flow of liquid. The Saussure invention is intended for oil purification, which employs granular fuller's earth as a purifying or filtering medium. Such material tends to "channel" when liquid is forced through it at high pressure; that is, the liquid cuts paths through the filtration medium and bypasses the majority of the medium, instead of spreading and seeping uniformly through the entirety of the medium's surface area. The holes in the separators of Saussure seek to discourage high pressure or high flow rates from causing channeling. However, channeling can still be expected in the immediate region of the holes, where flow rates are high. Channels there could propagate into the medium downstream from a hole.

Because the Saussure separators are metal, they are not flexible enough to snap into the hoop grooves. They include a gap in the outer ring, into which a block of wood is hammered to expand the ring into the groove. This is a cumbersome, unreliable method and is not usable with a canister too small for both arms to reach into and swing a hammer.

Australian patent 256,930 issued to Lewis shows the use of O-rings to seal a cap on a plastic cylindrical canister holding purifying media. O-rings are needed because, unlike metal, plastic absorbs water and changes its shape, according to Lewis.

U.S. Pat. No. 4,913,808 of Haque discloses the use of a submicron filter in a purifying canister, to remove bacteria. The filter is not used as a media separator.

None of the above inventions and patents, taken either singly or in combination, is seen to describe the instant invention as herein claimed.

The prior art does not show a purifier having various filter media separated by porous structural filters, the filters having evenly dispersed the fluid flow capacity to prevent channeling and also having no localized high flow as from discrete holes.

Neither has the prior art shown the use of semi-rigid and highly porous structural filter discs adapted to snap into hoop grooves which form distinct compartmental cavities to separate and house various active media beds of dissimilar densities.

Neither is there disclosed in the prior art a purifying canister with sections of various diameters.

Accordingly, one object of the present invention is a multi-medium liquid purification pressure vessel with the various media separated by semi-rigid filter discs.

Another object of the present invention is the use of the semi-rigid snap-in filters adapted to cooperate with ridges or grooves on the inside wall of a canister.

A further object of the present invention is a multi-media pressure vessel tank with distinct sections of the tank holding respective filtering media, the media separated by semi-rigid filters, and the tank canister sections being cylindrical and having various respective diameters to evenly disperse the flow rate through the alternate types of media.

These and other objects of the present invention will become readily apparent upon further review of the following specification and drawings.

SUMMARY OF THE INVENTION

The present invention provides a purification canister for the treatment of water and other piped liquids which includes five sequential stages of bacteriostatic purification, each employing a respective medium: Polymerbead, copper-zinc alloy, manganese dioxide, anion ion exchange resin, and coconut shell granulated activated carbon. This five-layer water treatment combination is hostile to bacterial growth, and either removes or significantly reduces the amount of organic and inorganic contaminants flowing therethrough. Other filtering media and various filtering media combinations may also be used whereby each of the filtering media layer beds can be specified and selectively positioned, and increased or decreased in volume, to address a particular piped liquid filtering need.

The multiple filtering media stages are axially stacked within the pressure vessel canister and are separated by 40-micron rated or lower semi-rigid spun polypropylene media separators. Liquid is admitted at the top end of the canister, sequentially passes down through the media beds, and then returns to the canister top through an axial riser tube. The tank canister is of blow-molded polypropylene, with a compression-sealed screw-on cap. The cap contains an inlet and outlet, which may be of the leak-free quick disconnect kind.

The pressure vessel tank canister walls of the present invention have molded internal grooves, similar to an oil drum, to hold the structural filter separators; the separators are porous discs, and snap into and out of the grooves. The grooves divide the canister into cylindrical sections, which increase in diameter in the direction of liquid flow and likewise define sections of varying heights and volumes.

Each section is either cylindrical or conical: The conical sections interconnect the cylindrical sections. In the cylindrical sections, the controlled flow rate is adjusted to the particular medium therein by the existing water pressure and the diameter of that section and the density of the respective media therein.

BRIEF DESCRIPTION OF THE DRAWINGS

FIG. 1 is a perspective view of the pressure vessel tank canister of the present invention showing the body and screw-on cap.

FIG. 2 is a cross section along section line 2—2 of FIG. 3. The plane of the cut passes through the cylindrical axis of the canister appliance body and cap. The threaded pipe connections and pressurized quick disconnect couplings are also shown.

FIG. 3 is a plan view of the cap, canister body, and pipe connections in the cap.

Similar reference characters denote corresponding features consistently throughout the attached drawings.

DETAILED DESCRIPTION OF THE PREFERRED EMBODIMENT

The exterior appearance of the present invention is shown in FIG. 1. A screw-on cap 10 includes circumferential indentations or crenulations 12, to serve as finger grips. On the top surface of the cap 10 is a threaded liquid inlet hole 16 and a similar outlet hole 14. Since the cap 10 is relatively thin, the threaded holes 14, 16 are placed in a raised or thickened island 18. These items are also shown in FIG. 3.

The cap 10 is preferably molded of ABS plastic. Many other food grade plastic and metal materials are also suitable.

The cap 10 screws onto an appliance body 40. Hoops 42a–42f are molded into the side of the tank canister body 40 to prevent channeling of the liquid, provide sidewall stiffening and also provide internal hoop grooves for mounting filters, as discussed below. The body is preferably blow molded of polyethylene, polypropylene, or comparable materials. Other thermoplastic materials could also be used, as well as thermosetting plastics, metal, glass, etc. The hoops 42 define the borders of the canister sections. The greatest diameter of the body 40 is about 8 inches.

Base feet 46 are preferably molded into the canister so that it will stand stably upright.

The inside of the drinking water appliance canister and the functional parts are best shown in FIG. 2. The threads 44 on the outside of the neck of the body 40 mate with internal threads of the cap 10.

An O-ring 20 is trapped between the flat surface of the neck top of the canister body 40 and the undersurface of the cap 10. As the cap 10 is tightened onto the body 40 the O-ring 20 is compressed and a leak-proof compression seal is formed.

The following discussion parallels the path of fluid through the canister.

Liquid flows into the inlet 16 through a quick disconnect fitting 22. The water enters the space within a conical upper distribution screen 24. The screen 24 is preferably molded of ABS plastic, or other comparable plastic materials. It contains numerous vertical slots 25 to distribute, generally radially, liquid flowing into the canister into the first chamber or section A containing granular purifying medium 44a. In the case of a water purifier, this first medium is preferably an inert polymer bead medium with a density less than that of water so that the beads float. If a liquid other than water is passed through the tank canister, the beads should float in that liquid as well. The flotation movement prevents channeling in this first section A and facilitates cleansing by back flushing, as discussed below. About one pound of beads will fill this section A. The polymer beads trap sediments and oxidated particulates which are rejected down the drain during the back wash cycle. This function keeps the respective media beds unplugged and substantially extends media life.

After flowing through the polymer beads 44a the water comes to a horizontal planar first filter disc 50a. Like each of the other ones of the four structural filters 50a–50d, the filter 50a is constructed of semi-rigid porous spun plastic fiber matte filter material. Preferably, 40-micron rated spun polypropylene is used as the filter material, but 30, 20, 10, 5, 1 or even ½ micron rated spun polypropylene may also be suitable. The discs may be each 3/16 inch thick, although the thickness may vary with design requirements. Also like the others, the first disc 50a is located and held by a hoop groove running circumferentially about the inside of the body 40, in this case, the groove 43a of hoop 42a, which is naturally formed along with the hoop 42a during the preferred blow-molding process of constructing the canister body 40.

All of the media separator filter discs 50a–50d are snapped into their respective grooves by merely bending them in the hand, and releasing them at the appropriate place inside the tank canister body 40. The use of semi-rigid or flexible filter material thus allows the body 40 to be designed with various diameters at different elevations, which allows the flow rate to be adjusted as discussed further below.

Although the filter discs 50a–50d are highly porous, they do not have holes in the sense of discrete openings distinct from surrounding impervious material. In this specification and in the following claims, the word "porous" will be used to denote this sort of material, which lacks holes but has an open flow structure allowing liquids to pass through at a predictable or specified flow rate.

The porous structural filters separate the filtering media, which is important as any admixtures of the several disparate media would tend to interfere with each others' actions. Not only would admixture lead to media caking or clogging, the denser/heavier media settle to the bottom and the less dense media would rise to the top. Thus, the intended purification would suffer, as the steps are best performed in some independent order. The coextensive porosity of the structural filters prevents local channeling near the surface of each filtering media bed. Unlike the case with holed separators, no concentrated high flow exists to encourage either local or spreading channels destructive to the desired treatment and filtering process.

In the case of a drinking water treatment appliance, the water continues from the bottom of the first filter 50a into the second chamber or section B and passes through about 3 pounds of a second medium 44b of highly pure copper-zinc alloy used to reduce lead, mercury and other heavy metals via an oxidation/reduction process. This medium 44b also dechlorinates the water (if it contains chlorine) by converting the toxic chlorine to a harmless chloride. Thence the water goes through the second snap-in filter 50b into a third section C, filled with about 1.5 pounds of naturally mined manganese-dioxide medium 44c to reduce turbidity and trap traces of sulfur, iron, manganese, and other potentially toxic compounds.

The fourth chamber or section D, between filters 50c and 50d, contains a strong base anion ion exchange resin medium 44d which scavenges trace amounts of nitrates, nitrites and color impurities. As with each of the respective media, the volume and positioning can vary depending upon the particular application. About one pound suffices.

The final polishing stage of bacteriostatic purification is by the medium 44l below filter disc 50d, in the bottom, fifth chamber or section E. This section is packed with hard-bead and predusted, acid-washed coconut shell granulated activated carbon which provides an enormous absorption and adsorption filtering surface area. This medium 44e about 5 pounds in weight, absorbs and adsorbs volatile organic compounds (herbicides, pesticides and solvents), carcinogenic trihalomethanes and microscopic particulate, eliminating virtually all unpleasant taste and odor.

The water, after passing through this final purification treatment stage, passes through the membrane of a second or lower conical polyethylene diverter screen 24a having vertical slots 25a. It then enters a riser tube 26. The structural filter discs 50a–50d are centrally bored to permit passage of the riser tube 26. Thence, the fluid passes through the outlet threaded hole 14, a second quick disconnect fitting 22, and on out into any tube or pipe attached to the fitting for use.

Since the pressure is higher inside the canister body 40 than in the outlet 14, the riser tube 26 will tend to stay put in the cavity in the cap 10 into which it fits, sealed on the outside edges by a compressible O-ring (not shown).

The entire canister is pressure rated at 125 psi for maximum continuous operation, and 300 psi without bursting for 15 minutes; so it can safely be connected to normal residential and commercial water supplies.

The ordinary use of the pressure vessel tank canister as described above is for improving water from the public water supply and some treated wells, which is controlled for bacteria reduction but is often laced with traces of dangerous toxic and carcinogenic chemicals and heavy metals. It is designed for under-the-sink, or similar, installation, but is adaptad as a counter top or wall-mounted installation. The cold water supply line is tapped into, and a line is run to the inlet 16 of the canister. The outlet 14 is connected to the faucet drinking water station. Water must pass through the purifying media on its way to the user.

The leak-free and pressurized quick disconnect attachments 22 shown in FIG. 2 maintain water line and internal tank pressure up to 125 psi when disengaged and are intended to permit convenient back flushing of the appliance. The leak-free connections are merely reversed, and tools are not needed. This encourages the periodic back flushing of the drinking water appliance. Because the diameter of the tank canister is significantly smaller at the top than the bottom, a unique "nozzle effect" or "Venturi effect" is engineered into the tank canister design of the present invention which allows a mechanically induced waterflow increase upon back flushing in order to more efficiently remove embedded particulate matter or pipe sediment from the top of the media bed without the need for any supplemental pump equipment.

A normally unused hoop 42e could be used to hold an extra structural filter disc to create a sixth separated filtering media bed.

It will be noted that the various sections of the pressure vessel canister body 40 are generally cylindrical, but are of different diameters. The change in diameter is accomplished by conical sections adjacent the hoops.

The total flow rate of liquid across a cross section of the canister, i.e., a section perpendicular to the axis of the cylindrically symmetrical canister body 40, is uniform all along the length of the body 40. This means that the average speed of liquid past the grains of any of the respective granular filtering media is determined in part by the diameter of the section of the canister in which that medium is contained. Assuming a constant flow pressure, the average speed is proportional to the inverse of the square of the diameter.

Because of this relationship, the tank canister of the present invention, which incorporates a series of cylindrical sections of varying diameters and lengths, allows a designer to predict both the speeds of the liquid through the various media, by specifying the section diameters, and simultaneously to determine the length of time a parcel of the liquid stays in contact with each medium, by optionally altering the length of each section. The actual "flow rate" through the bacteriostatic appliance is determined by the relative water pressure: 40 psi will deliver the preferred 1 gallon per minute flow rate for drinking water applications.

Since the section diameters will vary, then in the general case it may happen that the inner or lower sections will have greater diameters than those near to the neck of the body 40. Thus, the hoop grooves and snap-in flexible disc filters of the present invention will be seen to allow flexibility in selecting any of various arrangements for separating the sections for specialized custom treatment applications.

Of course, the principle of the invention and its inventive concept are not limited to cylindrical shapes. A tank canister having cross sections which in outline are square, triangular, or any other shape may be employed. Each section would still have a defined area and a length for controlling the flow.

It is to be understood that the present invention is not limited to the sole embodiment described above, but encompasses any and all embodiments within the scope of the following claims.

We claim:

1. A pressure canister for bacteriostatic purification and filtration treatment of water, said canister comprising:
- a cylindrically symmetrical hollow body of varying diameters and unitary construction including a plurality of interiorly spaced annular grooves, said body having a top neck opening and a base which supports said canister in an upright position;
- a series of sections having respective volumes and being axially arranged within said body, said sections containing respective layers of granular filter media;
- a plurality of semi-rigid porous filter discs separating adjacent layers of said granular filter media, said filter discs having peripheral edges disposed within said grooves; and
- a cap attachable to said neck opening to seal said body against leakage, said cap provided with water input means and water output means, said input means communicating with a first of said sections adjacent said top opening and said output means connected to a centrally positioned axial riser tube which extends proximate said base; whereby
- water under pressure entering said canister through said input means sequentially passes through said series of sections containing the respective layers of granular filter media at flow rates determined by the respective volumes of said sections, then the water moves upward through the riser tube and exits said canister through said output means.

2. The canister according to claim 1, wherein said input means and said output means include quick disconnect couplings for reversing water flow during back flushing.

3. The canister according to claim 1, wherein said filter discs are constructed of spun polypropylene.

4. The canister according to claim 3, wherein said filter discs are 40 micron rated.

5. The canister according to claim 1, wherein said series of sections containing respective layers of granular filter media are sequentially arranged in order from said input means, said order comprising:
- a first section containing an inert polymer bead medium;
- a second section containing a pure copper-zinc alloy medium;
- a third section containing a naturally mined manganese dioxide medium;
- a fourth section containing a strong-base anion ion exchange resin medium; and
- a fifth section containing an acid-washed coconut-shell granulated activated charcoal medium.

6. The canister according to claim 1, wherein said canister includes a compression seal between said cap and said top neck opening.

7. The canister according to claim 1, wherein the diameter of said body located proximate the top opening is substantially smaller than the diameter proximate said base.

8. The canister according to claim 1, wherein the respective volumes of said series of sections are varied by altering the placement of said filter discs within said grooves.

9. A pressure canister for bacteriostatic purification and filtration treatment of water, said canister comprising:
- a cylindrically symmetrical hollow body of varying diameters and unitary construction including a plurality of interiorly spaced annular grooves, said body having a top neck opening and a base which supports said canister in an upright position;
- a series of sections having respective volumes and containing respective layers of granular filter media, said sections being sequentially arranged in order from said top opening, said order comprising a first section containing an inert polymer bead medium, a second section containing a pure copper-zinc alloy medium, a third section containing a naturally mined manganese dioxide medium, a fourth section containing a strong-base anion ion exchange resin medium, and a fifth section containing an acid-washed coconut-shell granulated activated charcoal medium;
- a plurality of semi-rigid porous filter discs separating adjacent layers of said granular filter media, said filter discs having peripheral edges disposed within said grooves; and
- a cap attachable to said neck opening to seal said body against leakage, said cap provided with water input means and water output means, said input means communicating with a first of said sections adjacent said top opening and said output means connected to a centrally positioned axial riser tube which extends proximate said base; whereby
- water under pressure entering said canister through said input means sequentially passes through said series of sections containing said respective layers of granular filter media at flow rates determined by the respective volumes of said sections, then the water moves upward through the riser tube and exits said canister through said output means.

10. The canister according to claim 9, wherein the diameter of said body located proximate the top opening is substantially smaller than the diameter proximate said base.

11. The canister according to claim 9, wherein the respective volumes of said series of sections are varied by altering the placement of said filter discs within said grooves.

* * * * *